United States Patent [19]

Li et al.

[11] Patent Number: 5,714,762
[45] Date of Patent: Feb. 3, 1998

[54] DETERMINATION OF THE SURFACE PROPERTIES OF AN OBJECT

[75] Inventors: Lin Li; William Maxwell Steen, both of Liverpool; Peter Julian Modern, Preston, all of United Kingdom

[73] Assignee: British Nuclear Fuels plc, Cheshire, United Kingdom

[21] Appl. No.: 481,369

[22] PCT Filed: Nov. 8, 1994

[86] PCT No.: PCT/GB94/02451

§ 371 Date: Sep. 5, 1995

§ 102(e) Date: Sep. 5, 1995

[87] PCT Pub. No.: WO95/13520

PCT Pub. Date: May 18, 1995

[30] Foreign Application Priority Data

Nov. 9, 1993 [GB] United Kingdom ............ 9323054

[51] Int. Cl.[6] .................................................. G01N 21/01
[52] U.S. Cl. .................. 250/559.2; 250/559.42; 250/559.39
[58] Field of Search .................. 250/559.42, 559.2, 250/559.39, 559.45, 559.46

[56] References Cited

U.S. PATENT DOCUMENTS

| | | |
|---|---|---|
| 4,411,528 | 10/1983 | Newcomb et al. |
| 4,674,875 | 6/1987 | Koizumi .................. 250/559.42 |
| 4,731,855 | 3/1988 | Suda et al. ............... 250/559.39 |
| 4,842,411 | 6/1989 | Wood. |
| 5,150,254 | 9/1992 | Saitou. |
| 5,426,506 | 6/1995 | Ellingson et al. .......... 250/559.45 |
| 5,471,298 | 11/1995 | Moriya ................... 250/559.45 |

FOREIGN PATENT DOCUMENTS

| | | |
|---|---|---|
| 2 104 652 | 3/1983 | United Kingdom. |
| 2 241 061 | 8/1991 | United Kingdom. |
| WO 88/05904 | 8/1988 | WIPO. |
| WO9109564 | 12/1989 | WIPO. |
| WO 90/09560 | 8/1990 | WIPO. |

*Primary Examiner*—Edward P. Westin
*Assistant Examiner*—Kevin Pyo
*Attorney, Agent, or Firm*—Nixon & Vanderhye P.C.

[57] ABSTRACT

A method for the determination of the surface properties of an object which comprises irradiating the surface of interest with an incident beam of radiation from an optical source, detecting by a detector radiation from the beam scattered by the surface, the detector being located at a predetermined position relative to the surface and the optical source and digitizing and analyzing the image detected by the detector, wherein the incident beam has in cross-section a two dimensional envelope and within the envelope an intensity structure which has multiple edges running in more than one direction which provide information about components of the structure of the beam and the analysis of the image is a two dimensional analysis of the intensity shape and structure of the scattered radiation to provide information about the manner in which the incident beam intensity shape and structure has been changed by scattering at the surface of the object.

10 Claims, 6 Drawing Sheets

DETERMINATION OF THE SURFACE PROPERTIES OF AN OBJECT

BACKGROUND OF THE INVENTION

1. Field of the Invention

The present invention relates to the determination of the surface properties of an object, in particular the remote, contactless determination of one or more of surface orientation, distance, displacement, shape or the presence of surface discontinuities such as walls, corners and holes.

2. Discussion of Prior Art

In many industrial applications, such as robotic welding and laser materials processing, it is necessary to maintain the processing head or heat source at a constant standoff and with constant orientation relative to the surface of the object to be treated. This is often achieved by programming the robotic device by human teaching to follow the surface contour. However, in situations requiring remote handling, eg servicing, repairing or decommissioning of a nuclear materials processing plant, it is necessary for the surface contour to be detected by the robot with sensors. This is difficult to achieve particularly when the object is irregular with corners, sharp bends and vertical walls. The previous techniques for detecting the surface contour profile have been by tactile probes connected to a position sensor such as a LVDT (Linear Variable Differential Transformer) or linear resistance potentiometer, or non-contact proximity switches or sensors such as capacitive (for metal surfaces only), inductive (for metal surfaces only) and photoelectric sensors. Recently diode laser triangulation has been used with PSD (position sensitive devices which are usually linear photoelectric sensor arrays). All these devices require either direct contact or a close proximity to the surface. None of these devices give the information on surface orientation. In fact the accuracy of most of the devices is affected by the surface orientation and materials properties. With robotic laser materials processing, for example, orientation of the beam with the surface can affect the beam absorption. Thus the consistency of the processing quality cannot be maintained without knowing this information. Also, the control of robotic movement with short distance proximity sensor feedback could be risky in the cases of sharp corners, holes and walls.

A number of arrangements are described in the prior art which detect changes in the properties of a beam of optical radiation caused by reflection or scattering from the surface of an object to be investigated. The optical images formed on the object have been either one dimensional line images or simple two dimensional ring images and consequently it would not be possible to obtain suitable control information from such images. The effect of external lighting has not been considered in these prior art arrangements.

In particular, GB 2241061A describes a technique wherein one or more beams are projected onto a rotating object. The beam is essentially one or more one-dimensional stripes and information such as surface orientation at a particular region of the surface is not obtained and cannot be obtained (without relative motion and repeated scanning of the beam).

GB 2104652A discloses a method whereby a butt or seam on an object can be recognised during welding. Light in the form of a parallel line shaped grid is reflected from the object. There are no intersections between individual lines and the light structure is not therefore a truly two-dimensional and cannot be used to obtain orientation of the surface at the point of incidence. Also, the workpiece shape recognition resolution depends on the spacing of the projected grid lines. This system is suitable for an area shape recognition or location of features such as seams or butts rather than for on-line three dimensional tracking with orientation control. Also, possible influence of arc light on the sensing system may prevent the application of the device for real time applications. The system cannot provide multiple information such as x-y orientation, position and neighbourhood geometry at the same time for a spot on the workpiece surface.

WO 9009560 describes an arrangement in which laser light is passed through a grating and a converting lens to project two columns of parallel grid lines of light on different parts of the object surface. Information about the surface is obtained by a ccd camera which allows the size difference of the two columns to be compared. This arrangement cannot be used to determine absolute position of the object surface or information about surface orientation.

WO 8805904 describes an arrangement in which a line or multiple parallel lines of light are reflected from the surface of an object. Again, this arrangement cannot provide surface distance, surface orientation and surface neighbourhood information at the same time, ie from the same light beam.

U.S. Pat. No. 5,150,254 describes a device in which an endoscope tip is provided for conventional lighting on the surface of an object. The tip has to be located in close proximity to the object. Information about the surface position and orientation cannot be obtained using this device.

U.S. Pat. No. 4,842,411 describes an arrangement in which a series of parallel line beams are projected onto an object surface. This is not able to produce information about the surface at points between the projected lines, nor about the position and orientation of the surface.

U.S. Pat. No. 4,411,528 describes a device which projects a ring shaped light beam through a converging lens onto an object so that the size of the ring image projected on the surface, which changes with distance can be measured. The ccd camera used to detect the reflected image is co-axial with the light source. Since the measurement depends on the size of the image, it will depend upon surface reflectivity and colouring. A bright surface will give a bigger image and a dark surface will give a smaller image for the same distance.

SUMMARY OF THE INVENTION

The present invention presents a new approach to determine information such as the distance, displacement, orientation and shapes of the object surface of interest together with information on the presence of corners, holes and walls.

According to the present invention there is provided a method for the determination of the surface properties of an object which comprises irradiating the surface of interest with an incident beam of radiation from an optical source, detecting by a detector radiation from said beam scattered by the surface, the detector being located at a predetermined position relative to the surface and the optical source and digitising and analysing the image detected by the detector, wherein the incident beam has in cross-section a two dimensional envelope and within the envelope an intensity structure which has multiple edges running in more than one direction which provide information about components of the structure of the beam and wherein the analysis of the image is a two dimensional analysis of the intensity shape and structure of the scattered radiation to provide information about the manner in which the incident beam intensity shape and structure has been changed by scattering at the surface of the object.

According to the present invention in a second aspect there is provided an arrangement of apparatus for carrying out the method of the first aspect which comprises means for producing an output beam comprising said incident beam having a structured intensity cross-section, detector means for detecting radiation comprising said scattered radiation and for providing a signal representing an intensity profile of the scattered radiation and a signal processor for digitising and analysing said signal to form and analyse a two dimensional image of the surface of the object from which the radiation has been scattered.

The incident beam may comprise a collimated beam of laser or other light. Where a laser is employed it may be a solid state, gas or other laser. The structured cross-section or traced shape comprises a deliberately applied structure or shape such as a cross, cross in circle, cross in rectangle, multirectangular grid, multiple small circles in a larger circle, concentric circles, cross in a circle containing smaller circles or other distinctive structure.

The means for producing an output beam may include, in addition to a radiation beam, eg laser, source, a beam expander and/or beam diffuser/integrator as well as an aperture providing the appropriate shape(s) for the cross-sectional structure of the emerging beam.

The detector means for detecting scattered radiation may comprise a video camera (eg ccd camera) system or other known two-dimensional photodetector.

The signal processor may comprise a multiple array image processor, eg with a parallel processor, whose output is transmitted to a real time digital microcomputer, which together process and analyse the information comprising the image. The output of the computer may be applied to a display to form a visual image and/or transmitted to a remote receiver.

Alternatively, a multiple camera system and/or multiple frame grabbing system may be employed. Such a remote detection device or system enables shape and position variation of the incident beam caused by the scattering surface to be analyzed without movement of the beam source or the beam detector to give information about the inspected object, eg the distance, displacement, orientation or shape of the surface of the object.

In order to reduce the effects of ambient light on the detected image, the output beam directed at the surface of interest may be applied in pulses by application of a suitable, eg square, control waveform to the power supplied to the beam source and the detector means and/or the signal processor may be modulated in synchronism with the output pulses in a known manner.

In addition, a colour filter may be applied to filter radiation detected by the detector means in order to detect only radiation originating from the means for producing the output beam after reflection from the surface of interest.

The present invention may conveniently be used in a wide number of applications including automatic robotic three dimensional surface processing, surface examination in engineering construction, geographical or space applications, or automatic quality control of manufactured components in a production line. The present invention is particularly useful in remote handling operations, eg the maintenance, repair or decommissioning of a nuclear materials processing or reprocessing facility. The output signal provided by the digital computer may be employed as an error control signal in a feedback loop control system to control the movement of a robotic device or manipulator that is used to move either the object being investigated or a means located adjacent to it, eg a laser source being employed to produce a laser beam to treat the surface.

The means for producing an output beam and the detector means for detecting scattered radiation desirably subtend an acute angle (followed by the path of the incident and scattered radiation) at the inspected surface.

The principle of operation of the invention is as follows. When the incident beam is shone on a object surface of interest in a structured spot an image is produced with a degree of contrast relative to the background environment, ie unilluminated regions of the surface. The beam image can be detected by said detector and digitized and analyzed and reconstructed by the signal processor. If an angle exists between the incident and scattered radiation beam paths then the image viewed by the detector is the projection of the image on the object surface which is dependent on surface stand-off distance to the detector, and geometries used in the arrangement. By analyzing the shape and position of the detected image in comparison to the image projection known to be received from a standard flat surface the real object surface information such as stand-off, orientation and shape can be obtained. Generally speaking, the projection of the centre point of the incident beam spot is only dependent on the position or distance variation of the surface at that spot. The orientation of the image axis is dependent on the surface orientation and the shape of the image is dependent on the geometry of the surface.

One of the distinct features of the system is that the scattered beam detection system, ie detector and signal processor, can be placed remotely from the object. The use of the incident, eg laser, beam enables the beam structure formed on the surface to be relatively consistent even at far field operation when a beam collimator is used. The image can be detected (or zoomed in) remotely using a video (such as a CCD) camera or other imaging device and a long focal length lens with an extension tube.

The remote nature of the sensing system prevents potential hazards near the detection area such as flames, radiation, fumes, walls and obstacles. Thus useful information can be provided by computer to a manipulator such as a robotic processing machine for the appropriate adjustment to suit the surface profiles without running any risks of collision and damage.

A second beneficial feature of the system is that the measurement is independent of surface materials property, thus no calibration is required for different applications. This is because the determination of surface parameters or geometries is by position and shape variations within the components of the detected scattered radiation image.

A third beneficial feature of the system is that the object surface to be detected can be stationary or moving and no scanning of the incident beam is required to define the position and geometry of the object surface within the image formed. No relative movement between the optical source and detector is required.

A fourth beneficial feature of the system is that multiple information such as surface position and geometry data including surface orientation can be obtained from the system at the same time. Information about large area surface topography can be obtained by scanning over the object.

The surface being inspected may be one which is being treated by a laser beam or other heat source to produce meltpool or heated spot as described in our copending International Patent Application of even date, claiming priority from UK Patent Application No. 9323052.2 the contents of which International Application are incorporated herein by reference. Such a meltpool or heated spot is strongly radiation-emitting and we have found that the radiation light emitted can be detected, digitized and analyzed in a manner similar to that (described for example with reference to FIG. 1 hereinafter) for the scattered laser beam. Such a procedure provides information about the position, orientation and standoff distance of the surface of the emitting hot spot or meltpool. The information produced in this way may be compared in the computer with that obtained in accordance with the present invention using the structured laser beam. The signals detected, digitized and analyzed from the radiation emitted from the meltpool or hot spot provides information about the present position of a laser beam which is treating the surface of the object whereas the information obtained from the structured laser beam may be obtained from a surface position in advance of movement of the treatment site to that position.

The present invention is particularly useful in remote handling operations, eg the maintenance, repair or decommissioning of a nuclear material processing or reprocessing facility.

BRIEF DESCRIPTION OF THE DRAWINGS

Embodiments of the present invention will now be described by way of example with reference to the accompanying drawings, in which.

DETAILED DISCUSSION OF PREFERRED EMBODIMENTS

Figure 1:
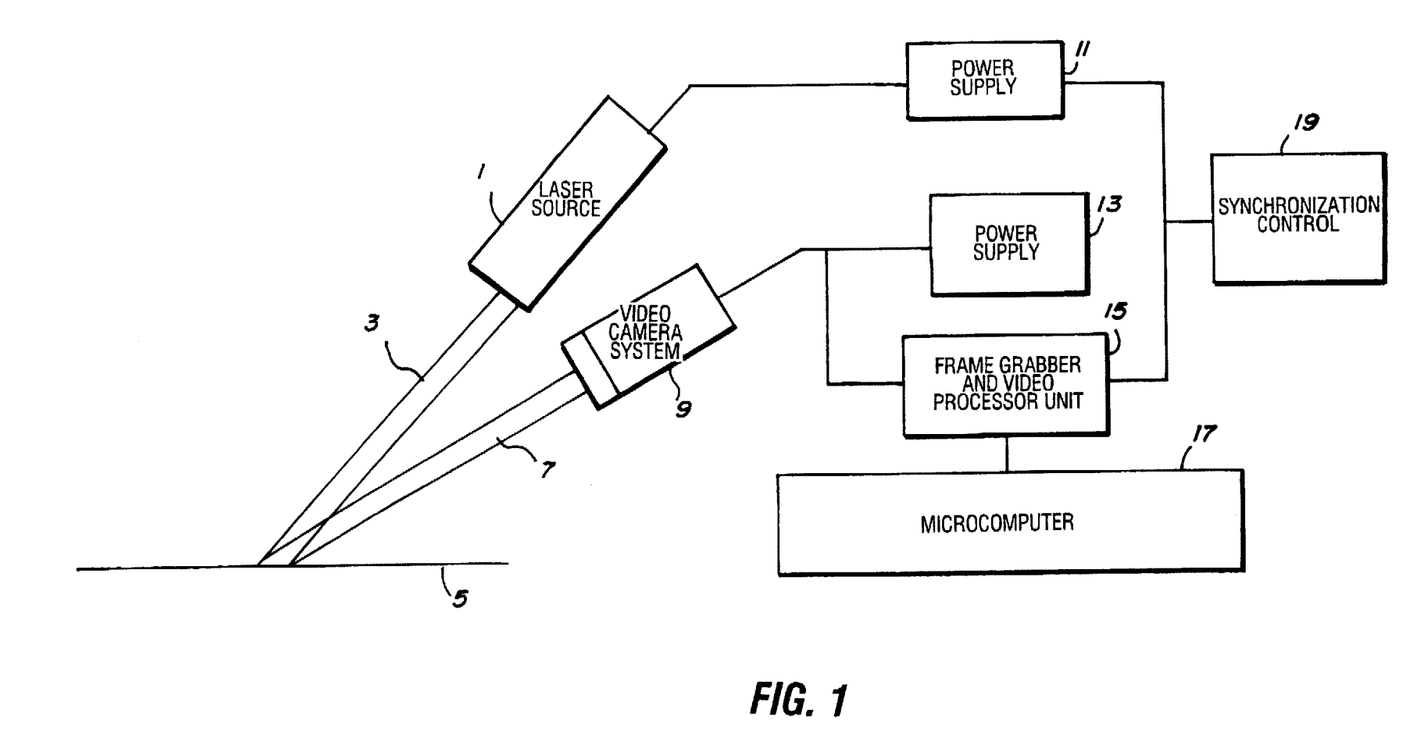
FIG. 1 is a diagram, partly in block schematic form, of a system embodying the present invention.

FIG. 1 shows a system for the remote sensing of surface orientation, displacement and shapes. A laser source 1 provides an output beam 3 which is employed to gather information from a surface 5 of an object of interest. The surface 5 scatters the beam 3 and the scattered beam 7 is detected by a video camera system 9. A power supply 11 is employed to energize the laser source 1 and a power supply 13 (which could be combined with the supply 11) is employed to energize the camera system 9. The output video signal provided by the camera system 9 is captured by a unit 15 comprising a frame grabber and local image processor and is further processed by a microcomputer 17. The output of the microcomputer 17 may be displayed, eg on a visual display unit (not shown) and/or transmitted to a remote receiver (not shown). A synchronization control 19 provides a signal which synchronizes modulation of the output of the power supply 11 and thereby the laser source 1 together with the frame grabber 15.

Figure 2:
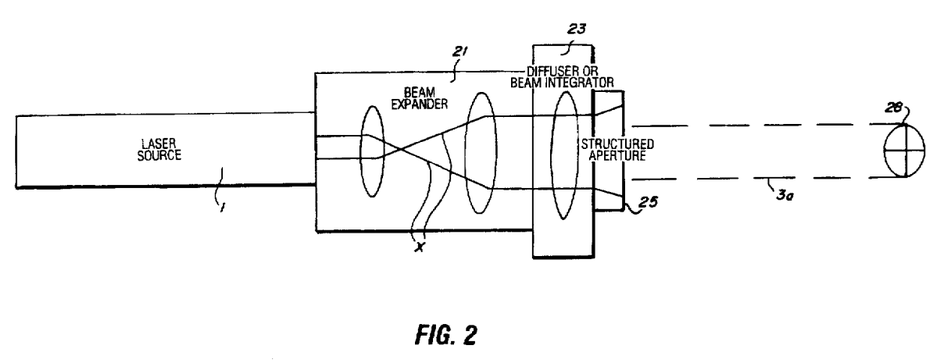
FIG. 2 is a side elevation illustrating an example of a beam producer for use in the system shown in FIG. 1.

FIG. 2 illustrates one form of optical arrangement which may be employed with the laser source 1 of FIG. 1. The output beam of the laser source 1 is passed successively through a beam expander 21, a diffuser or beam integrator 23 and a structured aperture 25 to form an enlarged beam 3a of structured cross-section providing a structured spot 28. The paths of the extremities of the optical output of the laser source 1 are illustrated by lines X.

Figure 3A:
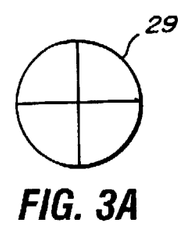
FIG. 3 illustrates beam shapes which may be produced by the beam producer shown in FIG. 2.
Figure 3B:
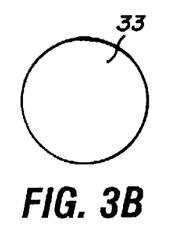
Figure 3C:
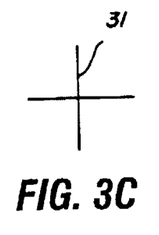
Figure 3D:
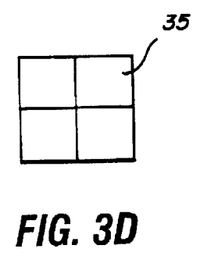
Figure 3E:
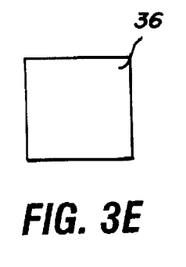
Figure 3F:
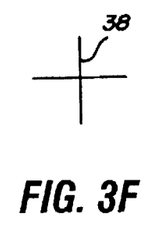
Figure 3G:
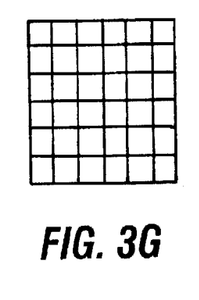
Figure 3H:
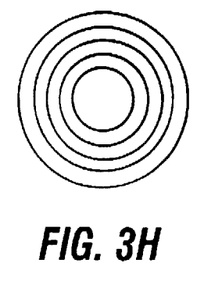
Figure 3I:
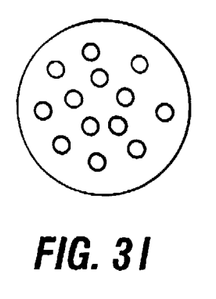

As illustrated in FIG. 3(a) the aperture 25 has a transmitting shape 29 comprising a cross 31 inside a circle 33. The cross 31 and circle 33 are also shown individually in FIG. 3(b) and (c). The beam 3a therefore has a corresponding cross-section as illustrated by the spot 28 which is the spot which will be incident on the object surface 5 (FIG. 1). Other shapes may be provided by replacing the aperture 25 with alternative apertures having different transmitting beam cross-sectional shapes. For example a shape 35 as in FIG. 3(d) comprising a cross inside a square may be used. The individual components 36, 38 of this shape are shown in FIGS. 3(e) and (f). Other examples, viz multi-rectangular grid, small circles in larger circle and concentric circles with cross are shown respectively in Figures (g), (h) and (i) respectively.

Figure 4:
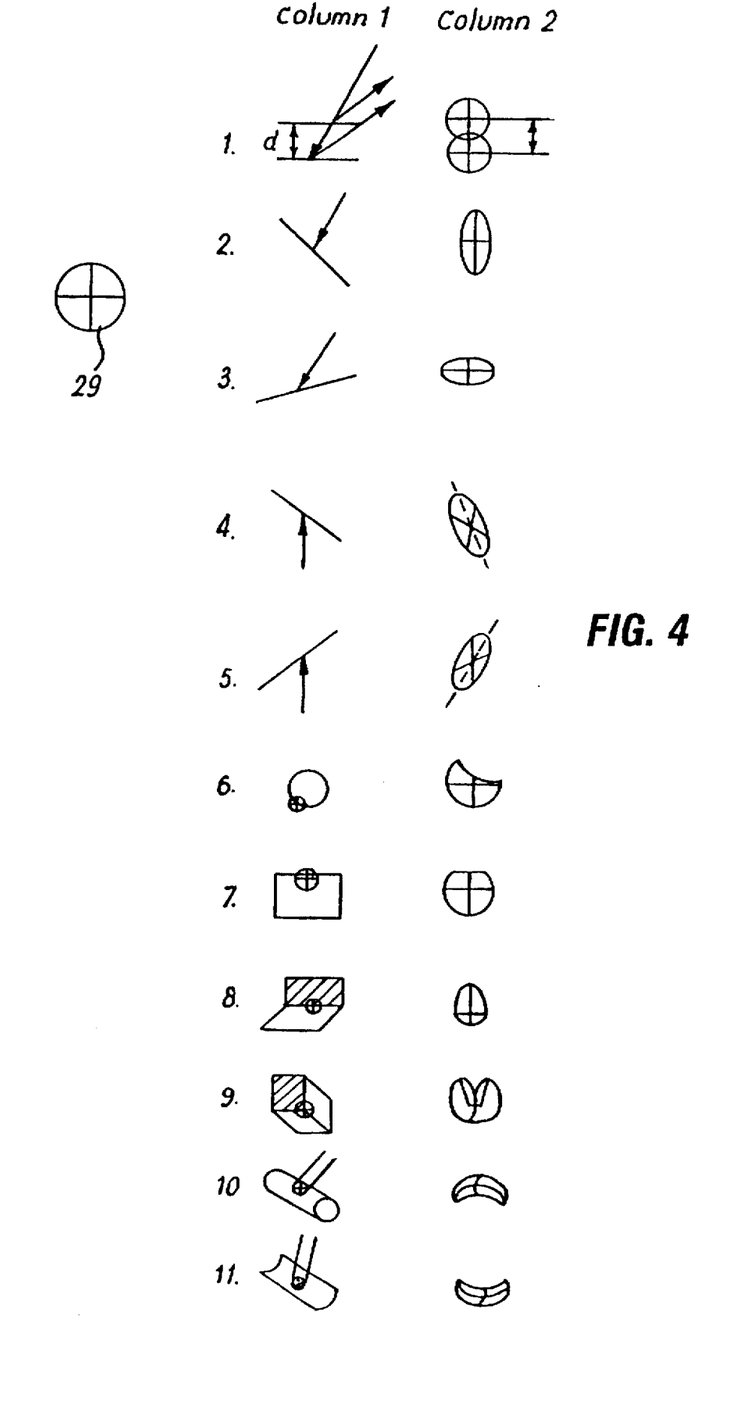
FIG. 4 illustrates various image shapes obtained from different object surface features in a system as shown in FIG. 1.

Some examples of the various images formed by various features on a surface (eg surface 5) are shown in FIG. 4. These examples show images formed by incidence of a laser beam (eg beam 3) structured as a cross-shape inside a circle 29 as shown in FIG. 4 on the surface (FIG. 1).

In FIG. 1, Column 1 illustrates the laser beam 3 incident on various surface features and Column 2 illustrates the shape of the corresponding image formed in each case. The items shown in Column 1 in FIG. 4 are as follows:

FIG. 4 Key:

| Item No. | Feature illustrated |
|---|---|
| 1. | Standoff distance variation |
| 2. | Tilted surface tilt, inward sense |
| 3. | Tilted surface tilt outward sense |
| 4. | Tilted surface tilt to right |
| 5. | Tilted surface tilt to left |
| 6. | Curved edge |
| 7. | Straight edge |
| 8 | Wall |
| 9 | Corner |
| 10. | Convex surface |
| 11. | Concave surface |

Figure 5:
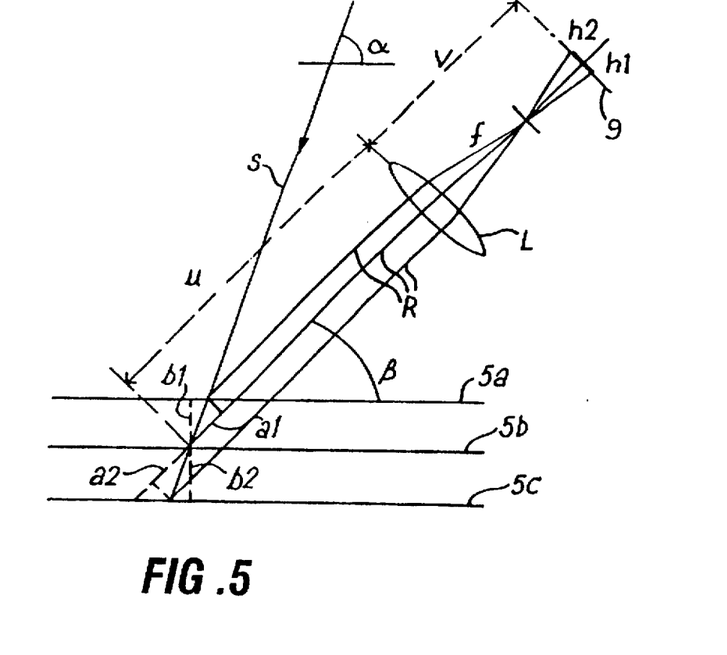
FIG. 5 is an optical ray diagram illustrating the geometrical relationships between the actual displacement of the distance to the object surface and image position variation in a system as shown in FIG. 1.

The basic geometrical relationships of the system shown in FIG. 1 and the factors that determine operating limits of the system are summarized as follows:

(1) The Relationship Between the Image Position and the Object Surface Distance and Displacement As shown in FIG. 5 the position of a single laser ray S (for example, the center of the incident beam 3) incident on the object surface 5 will vary as the distance changes. Three possible positions of the object surface 5a, 5b and 5c separated respectively by vertical distances b1 and b2 are shown in FIG. 5. The scattered rays R at an angle $\beta$ to the surface 5 in each case are focused by a lens L of focal length f and form an image in the image plane I of the video camera system 9 (FIG. 1). The lens L is a distance u from the point at which the ray S strikes the surface 5b. The distance from the lens L to the image plane I is a distance v. The distances between the point of impact of the ray S on the surfaces 5a, 5b and the distance between the point of impact on the surfaces 5b and 5c as measured along the path of the scattered ray R are a1 and a2 respectively.

The ratio between the image length on the video camera system 9 at image plane I and the actual distance displacement (for example h1/d1 or h2/d2) can be found from the geometrical relationships as follows:

Since $$\frac{a1}{b1} = \frac{\text{Sin}(\alpha - \beta)}{\text{Sin}(\alpha)} \qquad \text{Equation (1)}$$

and $$\frac{h1}{a1} = \frac{v}{f} - 1 \qquad \text{Equation (2)}$$

Thus the gain of the image system is $$\frac{h1}{b1} = \left(\frac{v}{f} - 1\right) \frac{\text{Sin}(\alpha - \beta)}{\text{Sin}(\alpha)} \qquad \text{Equation (3)}$$

From Equation (3) the object surface displacement can be obtained through the position variation of a particular image point such as the centre of the incident beam 3. Since the parameters on the right hand side of Equation (3) can be constant for a particular system, position variation of the projected image in the plane I is linearly proportional to the object surface displacement. A short focal length lens will give higher sensing resolution. Also, the bigger the angular difference between the incident and scattered beams the greater the resolution. The absolute distance can also be obtained by generating a small angular variation of the laser projection angle (α) to cause an image displacement. Since the image gain obtained from Equation (3) is equal to v/u where u is the distance between the camera lens L and the object surface 5 as shown in FIG. 5, the actual distance between the object and the camera can thus be easily calculated. Surface reflection and materials properties of the surface 5 therefore do not affect the sensing. For very long distance sensing such as in the application of space engineering the divergence of the laser beam over distance will change the size of the incident laser beam image spot which could be used to evaluate the distance as well.

(2) Relationships Between the Angular Displacement of the Object and the Length Variation of the Image The surface orientation of the object surface and the angular displacements of the surface orientation can be described by the surface angle in the plane of the source 1 and camera system 9 (γ) and the plane vertical to it.

Figure 6:
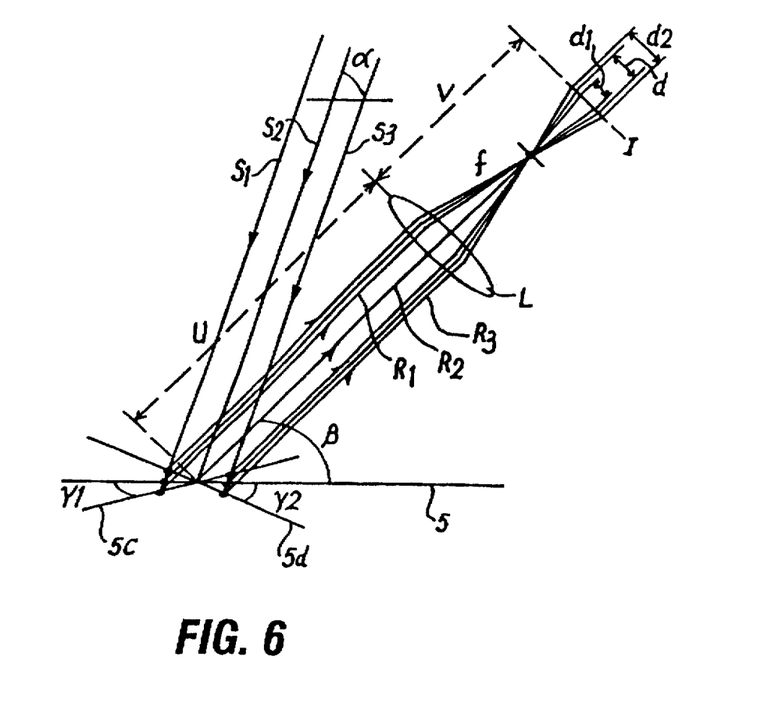
FIG. 6 is an optical ray diagram illustrating the geometrical relationships between angular displacement of the beam by the object surface and image dimension variation in a system as shown in FIG. 1; illustrating the geometrical relationship between object surface orientation change and image variation in a system as shown in FIG. 1.
Figure 7:
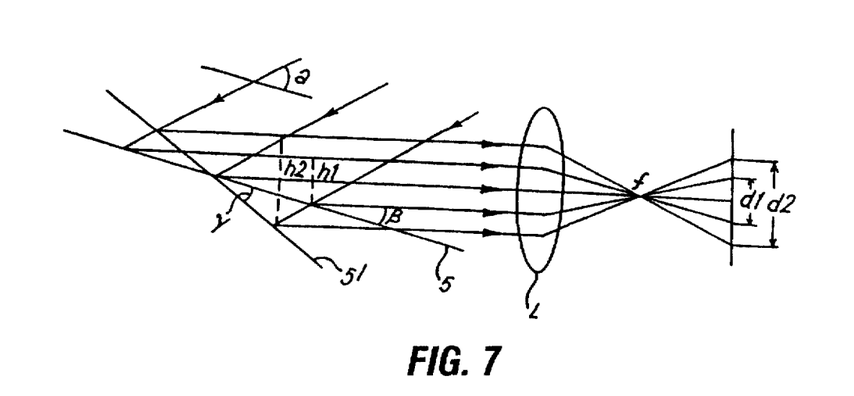
FIG. 7 is an optical ray diagram.

Reference symbols in FIG. 6 which are the same as those used in FIG. 5 have like meanings. In the case of FIG. 6, the surface 5 is shown to occupy two alternative positions 5c and 5d at tilt angles γ1 and γ2 respectively to the original position. In this case the incident beam comprises rays S1, S2 and S3 and the scattered beam formed by reflections at surfaces 5d, 5 and 5c respectively of the rays S1, S2 and S3 comprises respectively scattered rays R1, R2 and R3. The separations of extreme rays R1 and R3 in the image plane I are d1, d and d2 for reflections at the respective surfaces 5c, 5 and 5d. As illustrated in FIG. 6, for the source 1/camera system 9 arrangements as shown if the surface 5 tilts toward the camera system 9 the length of image will increase and vice versa. Suppose the image length projected on a horizontal surface is h1 and the projection on the image plane I is d1 as shown in FIG. 7. After an angular displacement of the surface 5 the image length projected on the surface 5 and video camera system 9 are h2 and d2 respectively. Then the relationship between the range of the length and the angular displacement γ of the surface 5, in the plane of the source 1 and system 9 can be found as follows:

$$\frac{d2}{d1} = \frac{\text{Sin}(\alpha)}{\text{Sin}(\beta)} \cdot \frac{\text{Sin}(\beta + \gamma)}{\text{Sin}(\alpha + \gamma)} \qquad \text{Equation (4)}$$

Equation (4) can be solved to find the surface angular displacement in the plane of system 9 and source 1 as follows:

$$\gamma = \text{Arcsin}\left[\frac{(d_2 - d_1)\text{Sin}(\alpha)}{\sqrt{d_1^2 \text{Sin}^2(\alpha)\text{Cotan}^2(\beta) + d_2^2 \text{Cos}^2(\alpha)}}\right] \qquad \text{Equation (5)}$$

It can be proved that the angular displacement ω vertical to the plane containing the source 1 and video camera system 9 is equivalent to the angular displacement of the principal axis of the spot image or the angular variation of the image.

(3) Sensing Resolution and Accuracy

This is dependent on the video camera system 9 resolution, lens type, image spot size, and picture magnification. Generally speaking the sensing resolution increases with lens focal length, image camera resolution, angle between beam source 1 and camera system 9 and is reduced with image spot size. The higher the resolution of the camera system 9, the longer the focal length the better resolution will be. For example, a camera providing 752×582 image elements would give 752×582 pixels for the whole TV monitor screen. If a spot size of 10 mm square is represented on a 14 inch screen by a 100 mm square occupying approximately 300×300 pixels, the resolution is 10 mm/300 pixel= 33 micron/pixel. A second camera looking only at the cross centre of the image would give this accuracy for position displacement sensing.

(4) Image Shape Analysis for Determination of Presence of Edges, Walls and Corners From FIG. 4 it can be seen that a projected circular beam spot can be badly distorted when there is a presence of edges, walls and corners. By comparing the distorted images with the known feature of the image pattern the presence of edges, walls and corners within the image spot range can be detected. An automatic recognition procedure can be employed using the following knowledge based rules (heuristics) and algorithms when the incident beam structure and image is divided into four equal parts by cross lines as illustrated as item 29 in FIG. 4.

Edges and Holes

IF there is a reduction of image area and the cross lines are straight or piecewise linear and IF the area difference between the filled convex-hull and the filled image is positive (image area is not lost by internal holes) THEN it is likely that there is an edge presence. OTHERWISE there is one or many internal holes. Count number of holes.

The size of the area loss can be used to determine the extent the image position towards the edges or the average size of holes. A radial line length scan from the center point to the image edges will give the exact location and shape of the edges by symmetrical analysis. An approximate position of the edge and holes can be obtained by locating the smaller areas of the four parts.

Walls and Corner Walls

IF there is an increase of the image size and the cross lines are piecewise linear and IF there the difference between the filled convex-hull and filled image is greater than zero (or a given threshold value) THEN there is a wall presence. The distinction between straight walls and corner walls can be found by calculating the number of regions after the area difference (2 for straight walls and 3 for corner walls). Also by locating the geometric center of the remaining regions (after the difference), location of the walls can be obtained.

(5) Object 3-D Geometry Recognition

Local geometry of the object surface can be determined from the spot geometry of the beam spot on the surface as shown in FIG. 4. A database of features of different standard geometry is stored in the computer. Comparison of real image with these image features allows the surface geometry to be determined using neural network analysis and fuzzy logic. For example a cylindrical object would distort the image such that the central cross lines or edge lines are arc rather than straight lines. A suitable neuro-net for this diagnosis is shown in FIG. 8.

Figure 8:
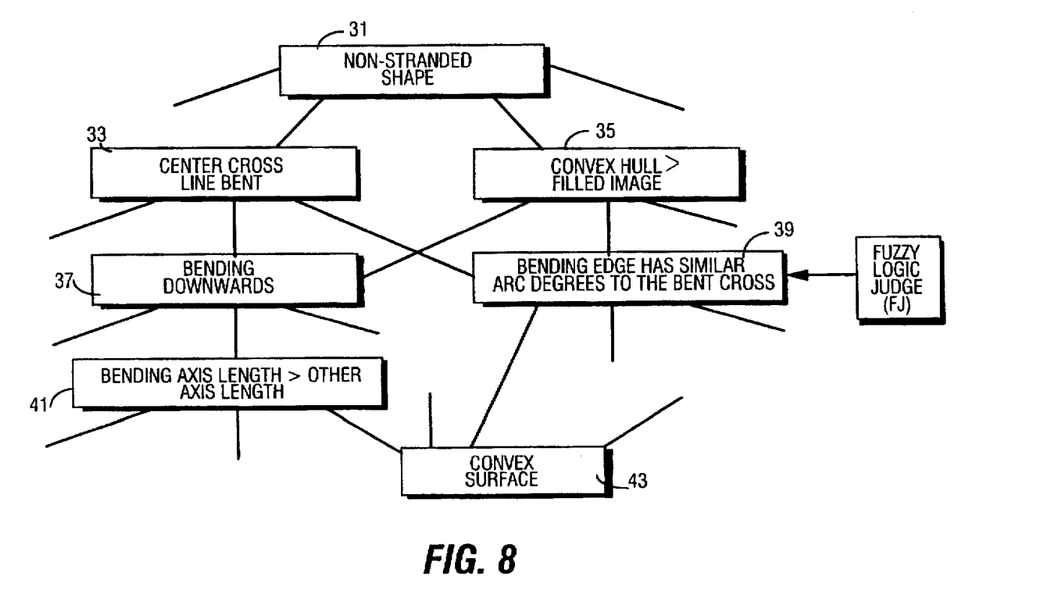
FIG. 8 is a flow diagram illustrating a process of shape recognition using neural network logic useful in the system shown in FIG. 1.

In FIG. 8, boxes shown represent the following conditions:

| Box No. | Condition |
| --- | --- |
| 31 | non-standard shape |
| 33 | center cross line bent |
| 35 | convex hull > filled image |
| 37 | bending downward |
| 39 | bending edge has similar arc degree to the bent cross |
| 41 | bending axis length > the other axis length |
| 43 | convex surface |

In addition, the input labelled FJ in FIG. 8 represent a known fuzzy logic judge. Large object geometry is determined by scanning the spot beam or using a grid network or lines. The former requires a servo system and latter requires a large laser pattern generator or masks.

(6) Processing Speed

The processing speed depends on camera scanning rate, frame grabbing speed and data processor hardware and software structure. For example, the normal CCD scanning rate is 25 frames of picture per second. Therefore the maximum processing rate is restricted by this value, ie 40 ms upgrading rate. Parallel processing with multiple frame grabbers and cameras can increase this limit by factors of n through alternative sampling, where n is the number of camera systems.

(7) Range of Sensing

For continuous variation of the surface geometry the immediate next position sampled by the system should be within the imaging device frame range. For example a 752×582, 25 Hz camera with magnification of 10 on a 14 inch TV screen (or 0.24 on a 0.5" image sensor), a 10 mm spot on the object surface would allow the maximum displacement of the object of ±10 mm within 40 ms. Automatic adjustment of the system to the object surface would allow the sensing range to be extended.

In a specific example of the use of a system as shown in FIG. 1 a 7 mW NeHe laser with a red beam was used with optics of beam collimators (or beam expanders), beam diffusers/beam integrators and pattern generators (a structured mask) to project structured light on the object of interest. A video camera (PULNIX TM-620 B/W 752×582 CCD) was placed at an angle to the projected laser beam. An optical filter (narrow band at 632.8 nm for a red HeNe laser) to allow the camera only response to the laser wavelength was used to eliminate the effect of background light. The image detected by the video camera was then analyzed in real time by stand alone multiple array image processors with a parallel processing board (CENTURION). The processed information was then transmitted to a host computer (OPUS V PC 486) through serial lines (RS232) for further analysis and digital/graphic display.

An on-line laser image surface monitoring and control system was realised using PASCAL 6.0 programming of the computer. A Menu driven keyboard VDU control system for the computer was implemented for parameter setup, load/save data, operating selection and real time process parameter display in both digital and graphic forms. An example of the system was used to determine automatic surface standoff, orientation, shape monitoring and closed loop standoff control during high power $CO_2$ laser processing of a stepped sample. A SHAPE FACTOR defined as the ratio between the length of longer axis (least momentum) and shorter axis (vertical to the least momentum) of the image was determined. A GEOMETRY factor was also determined having four possibilities: flat, convex, concave and irregular. The minimum laser beam intensity required to enable good image sensing was found to be around 10 $W/cm^2$. Higher intensity gives better resolution since binary image calculation is used throughout.

We claim:

1. A method for the determination of the surface properties of an object which method comprises:
   irradiating the surface of interest with an incident beam of radiation from the optical source,
   detecting by a detector radiation from said beam scattered by the surface, the detector being located at a predetermined position relative to the surface and the optical source; and
   digitizing and analyzing the image detected by the detector, wherein the incident beam has in two dimensional cross-section an intensity distribution which has at least two non-parallel intensity distribution edges, each edge including an intensity change across the edge, the analysis of the image comprising a two dimensional analysis of intensity shape and structure of the scattered radiation to provide information about the manner in which the incident beam intensity shape and structure has been changed by scattering at the surface of the object.

2. A method as in claim 1 wherein the incident beam comprises a laser beam.

3. A method as in claim 1 wherein the beam shape and structure comprises a two dimensional region which includes at least one of a cross, a cross in a circle, a cross in a rectangle, a multirectangular grid, multiple small circles in a larger circle, and concentric circles.

4. A method as in claim 1 wherein the beam produced by the optical source is passed through one of a beam expander and beam diffuser/integrator as well as an aperture imposing said intensity distribution upon the cross-sectional structure of the beam, which constitutes said incident beam.

5. A method as in claim 1 wherein the detector means for detecting scattered radiation comprises a video camera system or other two-dimensional photodetector.

6. A method as in claim 1 wherein the incident beam directed at the surface of the object is applied in pulses by application of a control waveform to the power supplied to the optical source, the image signal produced by the detector being referenced to a corresponding reference waveform.

7. A method as in claim 1 wherein radiation scattered by said surface is passed through an optical filter prior to detection by the detector.

8. A method as in claim 1 further including the steps of:
   thermally treating said object to form a meltpool or hot spot; and detecting radiation radiated by the meltpool or hot spot by means of a detector to form an image of the meltpool.

9. A method as in claim 1 wherein signals produced by detection, digitization and analysis of the image of the scattered radiation are applied to a robotic device or manipulator arranged to carry out operations on the object or on a means to treat the object.

10. A method as in claim 1 wherein the object being investigated is part of a nuclear plant which is being serviced, repaired or decommissioned in a remotely controlled environment.

* * * * *